(Model.)
G. H. COATES.
Hair Clipper.
No. 238,353.   Patented March 1, 1881.
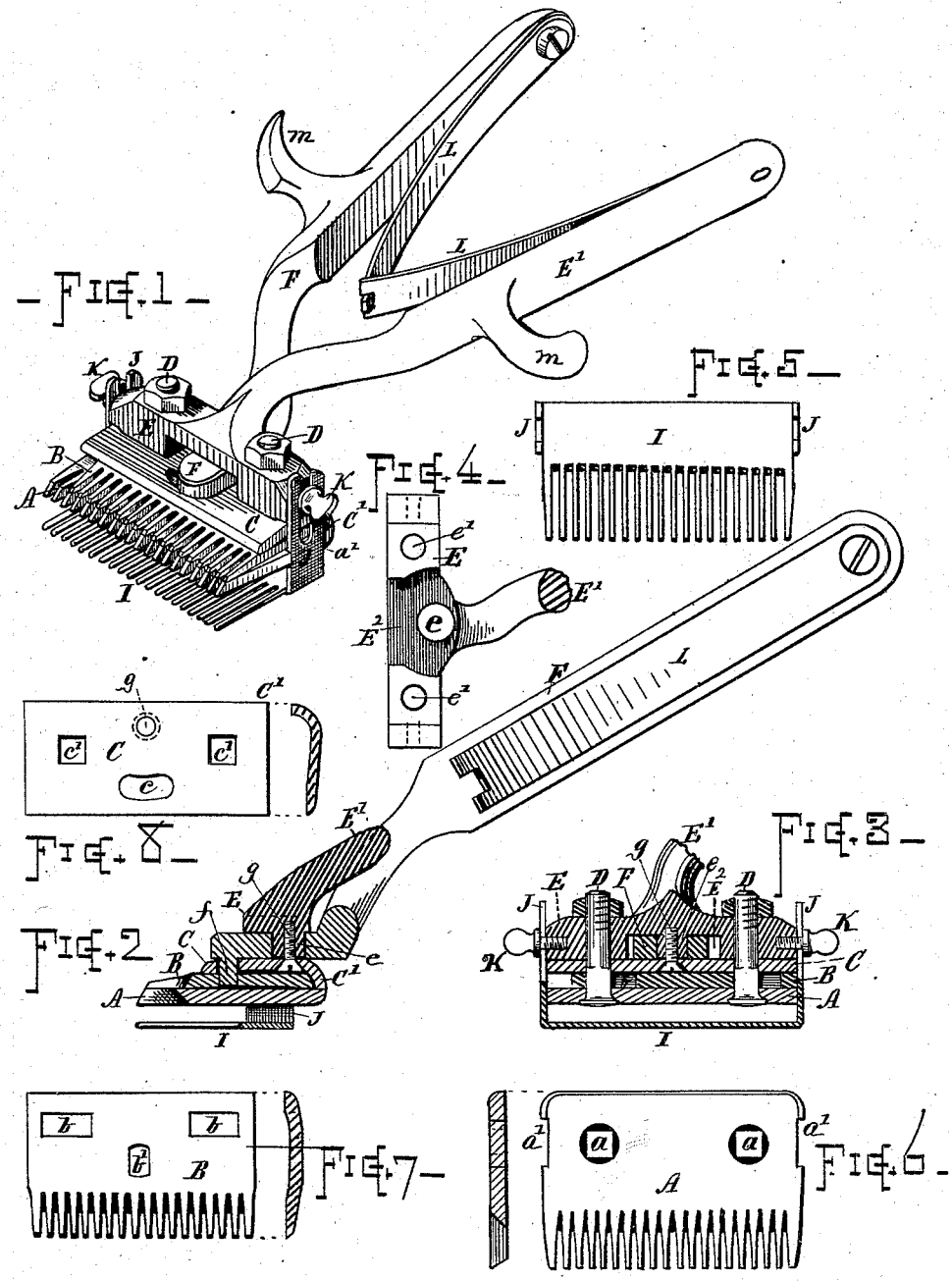
WITNESSES.
E. H. Burleigh
Wm F. Burleigh
INVENTOR.
George H. Coates
By Chas H. Burleigh
Atty.

UNITED STATES PATENT OFFICE.

GEORGE H. COATES, OF WORCESTER, MASSACHUSETTS.

HAIR-CLIPPER.

SPECIFICATION forming part of Letters Patent No. 238,353, dated March 1, 1881.

Application filed November 19, 1880. (Model.)

*To all whom it may concern:*

Be it known that I, GEORGE H. COATES, of Worcester, in the county of Worcester and State of Massachusetts, have invented certain new and useful Improvements in Clipping-Machines; and I declare the following to be a description of my said invention sufficiently full, clear, and exact to enable others skilled in the art to which it appertains to make and use the same, reference being had to the accompanying drawings, which form a part of this specification.

My invention relates to improvements in the construction of clippers for cutting hair, the object thereof being to render the mechanism compact and convenient in form and construction, also durable and efficient for use. These objects I attain by the mechanism shown in the accompanying drawings, and hereinafter described, the particular subject-matter claimed being definitely specified.

In the drawings, Figure 1 is a perspective view, illustrating one of my improved clippers. Fig. 2 is a longitudinal central section of the same. Fig. 3 is a transverse section of the same. Fig. 4 is a bottom view of the cross-head. Fig. 5 is a plan view of the adjustable comb-plate. Fig. 6 is the cutter-plate, bottom view and section. Fig. 7 is the cutter-blade, top view and section; and Fig. 8 is the presser-plate, top view and section.

The clipper, as herein shown, is made in size and form as adapted more especially for barbers' use for hair-cutting, but may be modified in sizes to meet the requirements for animal-clipping.

A denotes the cutter-plate, formed as in Fig. 6, with square holes $a$ countersunk circular for the holding bolt-heads, fitted with side recesses, $a'$, and provided with cutting-teeth along its front edge.

B denotes the cutting-blade or vibrating part of the clipper-shear, formed as in Fig. 7, with rectangular guiding-slots $b$ and central slot, $b'$, for the vibrating stud to enter.

C denotes the presser-plate for holding the cutter-blade B down onto the cutter-plate A. It is made, as in Fig. 8, with curved back edge, C', for locking over the rear edge of the blade, a slot, $c$, for the passage of the vibrating stud, and with openings $c'$ for the connecting-bolts D.

E denotes the cross-head on the handle E', to which the plates A B C are connected. Said cross-head has a central recess, $E^2$, for the reception of the handle F, which carries the vibrator-stud $f$, and centrally of said recess is a stud, $e$, formed with or being a part of the cross-head, and properly milled off to serve as the center pivot or fulcrum of the handle F, which latter is provided with a hole or opening to fit onto said stud $e$. The cross-bar is provided with openings $e'$ for the connecting-bolts D.

When the parts are put together they occupy positions as shown in Figs. 1, 2, and 3, the cutter-blade being clasped or confined between the plates A and C, its guiding-slots $b$ engaging with the square portion of the bolts D, which latter pass up through the several plates, A B C, and cross-head E, and serve both to confine the parts together and to adjust the tension or strain on the vibrating cutter-blade B, the tension being varied by turning the nuts on said bolts D.

A small screw, $g$, may be arranged through the plate C to screw into the stud $e$ for retaining said plate and the handles in connection when the cutters are removed for sharpening; or, if preferred, the screw $g$ may be omitted.

I denotes a comb-plate made, substantially as shown in Fig. 5, to match the bottom of the cutter-plate A, and provided with upward-extending slotted arms J, by means of which the said comb-plate I is adjustably connected to the ends of the cross-head E by means of thumb-screws K. The lower part of the arms J fit into the recesses $a'$ of the plate A, so that said comb-plate I and cutter-plate A are supported parallel with each other, as indicated. The plate I serves as a gage for adjusting the height at which the cutters work, and regulates the length at which the hair is clipped.

The handles are provided with springs L L for forcing them apart, and with projections $m$ or finger-guards to facilitate the gripe when operating the mechanism.

It will be observed that this clipper is very compact, being quite short from front to rear, so that it can be conveniently worked into small curves, that it can be quickly adjusted to cut the hair at any length, and that its parts are arranged to operate with accuracy, freedom, and power, while the instrument can be manipulated with facility, and the work performed in a superior manner.

What I claim as of my invention, and desire to secure by Letters Patent, is—

1. The combination, with the stationary and vibrating plates provided with shearing-teeth, and the presser-plate having downward-curved rear edge, respectively, constructed and arranged as shown, of the cross-head E, carrying the handle E', the handle F, pivoted thereto at e, and the bolts D D, arranged through said plates and cross-head, in the manner and for the purposes set forth.

2. The combination, with the vibrating and stationary cutter-plates B A, the latter being provided with side recesses, a', of the auxiliary comb-plate I, arranged parallel with said cutter-plates, and provided at its ends with upward-turned slotted arms J, fitting into said recesses a', and secured to the cross-head E by thumb-screws K, in the manner substantially as described.

Witness my hand this 16th day of November, A. D. 1880.

GEORGE H. COATES.

Witnesses:
CHAS. H. BURLEIGH,
GEO. M. RICE, 2d.